July 25, 1944.  H. D. STEVENS  2,354,432
APPARATUS FOR MAKING INNER TUBES
Original Filed Nov. 28, 1939   2 Sheets-Sheet 2
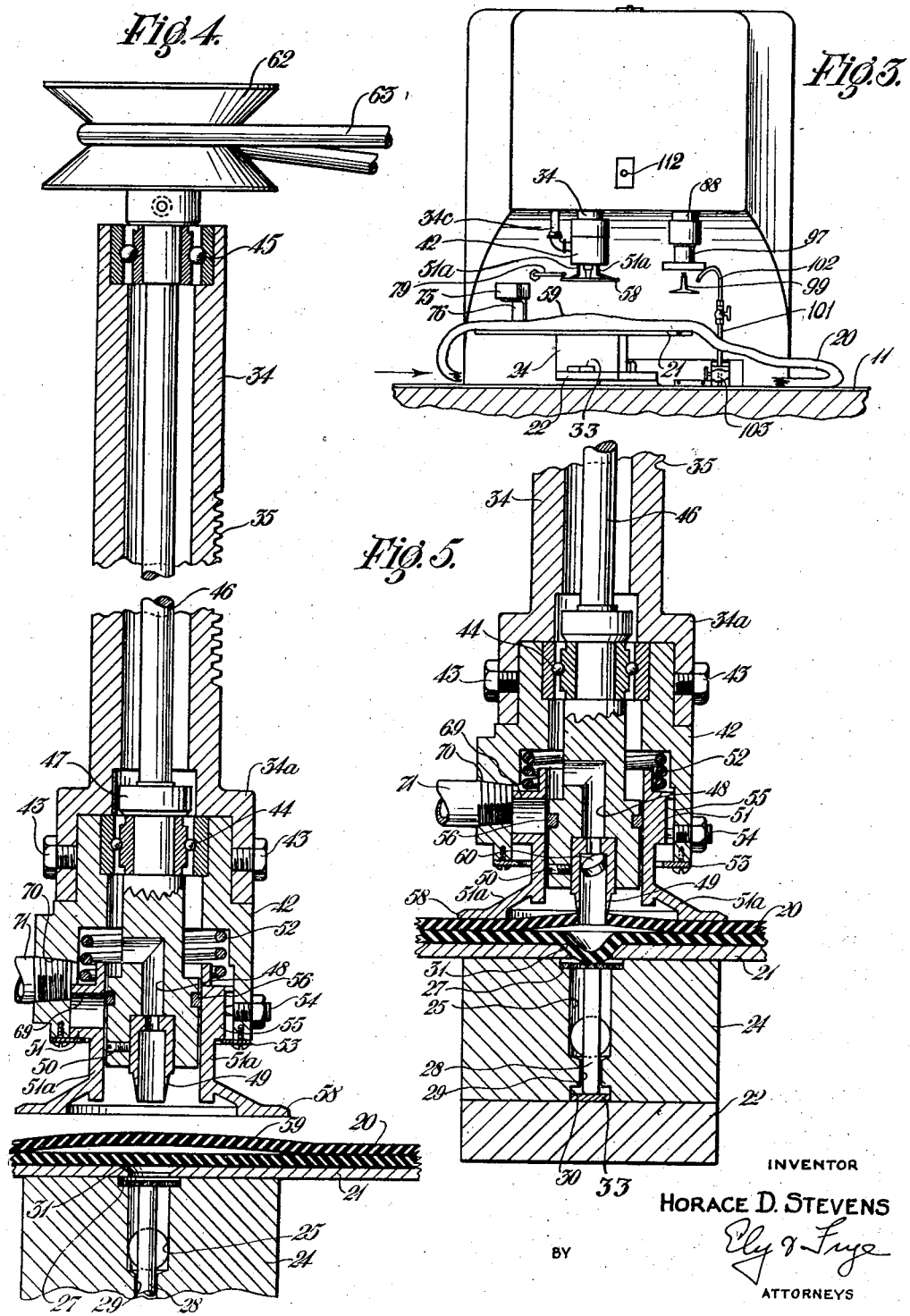
INVENTOR
HORACE D. STEVENS
BY
ATTORNEYS Patented July 25, 1944

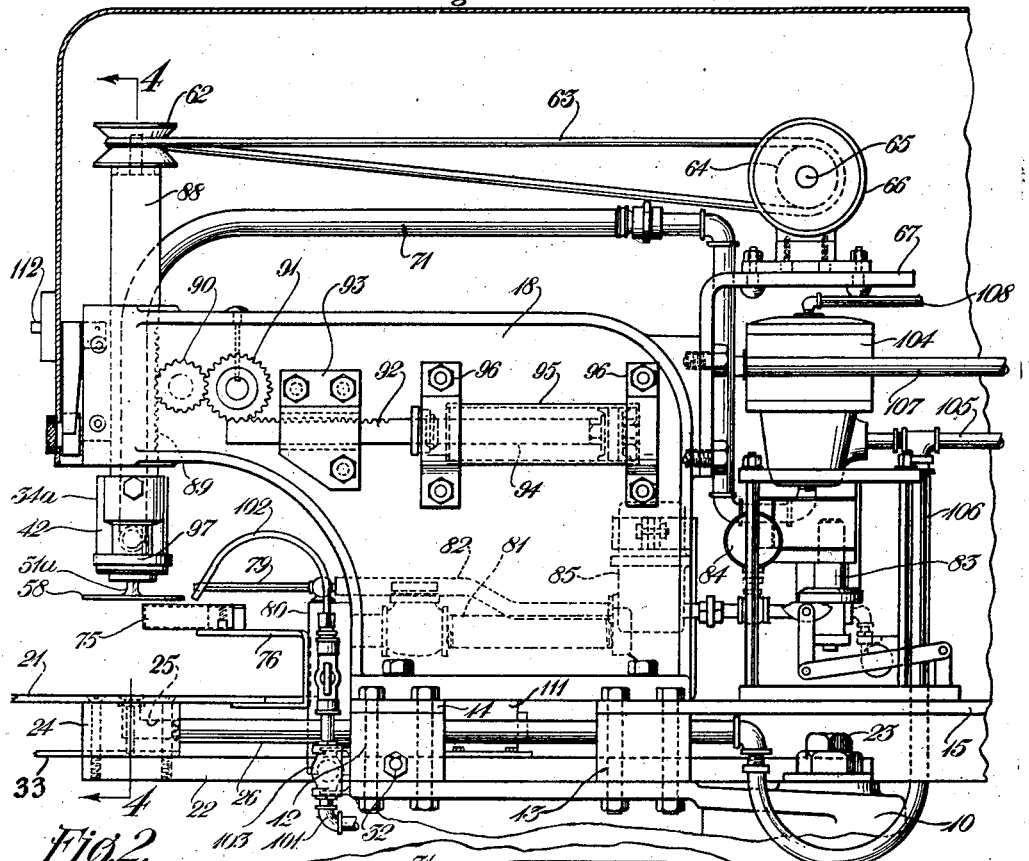

2,354,432

UNITED STATES PATENT OFFICE 2,354,432

APPARATUS FOR MAKING INNER TUBES

Horace D. Stevens, Akron, Ohio, assignor to The Firestone Tire & Rubber Company, Akron, Ohio, a corporation of Ohio Original application November 28, 1939, Serial No. 306,514. Divided and this application July 26, 1941, Serial No. 404,191

5 Claims. (Cl. 154—9)

This invention relates to apparatus for the manufacture of inner tubes for pneumatic tires, and more especially it relates to improved machines for forming apertures in endless unvulcanized inner tube structures of the "leak-proof" type, and for mounting valve stems on the respective inner tubes over said apertures.

The application is a division of my prior application for United States Letters Patent Serial No. 306,514, filed November 28, 1939, now Patent No. 2,272,895, issued February 10, 1942.

Inner tubes of the character mentioned have their interiors coated with a viscous composition that seals the minute pores in the rubber and thus prevents seepage of air therethrough. In the manufacture of such tubes, a determinate quantity of the viscous composition is spewed into a length of unvulcanized rubber tubing, after which the ends of the tubing are spliced together to provide an endless tube structure. The latter is then rolled or pressed progressively in a longitudinal direction to effect a uniform distribution of the sealing composition throughout the interior of the tube. Thereafter the tube requires to be apertured to provide the necessary port over which the valve stem is mounted to enable inflation and deflation of the tube. Heretofore considerable difficulty has been encountered in aperturing the tube due to the necessity of separating the walls thereof so that in perforating one wall of the tube the opposite side or wall will not be damaged, and it is to the solution of this problem that this invention primarily is directed.

The chief objects of the invention are to provide an improved apparatus for aperturing the wall of an unvulcanized inner tube structure; to avoid the possibility of damaging the wall of the tube opposite the aperture during the forming of the latter; to impart a slight tension to a local region of the tube while an aperture is being formed in said region; to effect the separation of the tube walls in a local region thereof as an aperture is formed in said region; and to provide for disposition of the slugs cut from the tubes in the forming of apertures therein. Other objects will be manifest as the description proceeds.

Of the accompanying drawings:

Figure 1 is a side elevation of apparatus embodying the principles of the invention;

Figure 2 is a plan view thereof;

Figure 3 is a fragmentary front elevation of the apparatus, and the work therein;

Figure 4 is a vertical section through the aperture forming spindle of the apparatus, and the work, on a larger scale in inoperative position, as viewed substantially on the line 4—4 of Figure 1; and Figure 5 is a fragmentary section of the parts shown in Figure 4, in operative engagement with the work.

Before an inner tube is ready for treatment in the apparatus of the invention, certain preparatory operations are necessary beginning with the placing of the viscous sealing or proofing composition within the length of tubing as previously explained. At such time a blast of air is directed into the end of the tube, so that when the tube is spliced immediately thereafter, some of the air is entrapped and confined within the tube. The air, of course, remains in the tube during the rolling operation that distributes the proofing composition throughout the interior of the tube and presses it to flattened condition, in which condition it is presented to the operator of the apparatus that apertures the tube and mounts a valve stem thereon. To prepare the tube for the apparatus, the operator presses upon the tube with her hand, and slides her hand longitudinally of the tube to force air in the tube to a local region thereof, where it forms a bubble or blister that serves the purpose of holding the opposite, top and bottom, walls of the tube in separated, spaced apart position. Then the top of the blister is swabbed with a hydrocarbon solvent, after which the tube is mounted in the apparatus of the invention, presently to be described, wherein subsequent operations of manufacture are carried out.

Through the agency of the apparatus, the operator first applies suction to a local zone of the bottom wall or ply of the tube, in the region of the blister, to produce a downwardly extending recess or reentrant in the bottom wall of the tube. The presence of air in the tube at this point assures that only the bottom wall of the tube will have the recess or reentrant formed therein. With the tube so held, the apparatus next effects a slight tensioning of the upper wall of the tube, over the recess in the bottom wall, after which a circular blank is cut from the upper wall of the tube, directly over said recess and reentrant, the presence of the latter preventing the possibility of damage to the lower ply of the tube by the cutting instrumentality. The slight tension in the region of the tube that is being apertured facilitates the cutting of the blank from the tube. As soon as it is severed from the tube structure, the blank is sucked into the cutting mechanism, and subsequently is ejected therefrom by air under pressure. As soon as the cutting mechanism is removed from the tube, the latter is moved so that the aperture just formed is in axial alignment with a vertically movable head that carries a rubber valve stem. The depressing of said head applies the base flange of the valve stem to the tube structure over the aperture therein, the head releasing the valve stem as it rises. This completes the cycle of operation and the tube is ready for the subsequent vulcanizing operation.

The apparatus for cutting the aperture in the tube and for applying the valve stem thereto is shown in the accompanying drawings to which attention now is directed. As is best shown in Figures 1 and 2, the apparatus comprises a bed plate 10 that is mounted upon a suitable supporting structure (not shown) of proper height to position the apparatus for convenient manual operation. Preferably the supporting structure is positioned beside a conveyor 11, Figure 3, upon which endless inner tube structures are brought to the apparatus, and are carried away therefrom after being operated upon by the apparatus. A portion of the bed plate 10 extends laterally over the conveyor, and carries on its upper face four spacer blocks 12, 12, and 13, 13 which blocks are arranged in rectangular form with the blocks 12 disposed at opposite corners of the front margin of the bed plate and the blocks 13 disposed somewhat to the rear thereof, at opposite sides of the plate. Supported upon the spacer blocks 12 is a supporting plate 14 that is of the same width as the said spacer blocks. Supported at its front margin upon the spacer blocks 13 is a relatively large plate 15, which plate is supported at its rear by any suitable means (not shown).

Carried upon the supporting plate 14 and the front marginal portion of plate 15 are dual frames 17, 18, which frames are of substantially similar construction and are arranged side by side, each frame having a forwardly extending portion that overhangs the supporting plate 14. The frame 17 carries the mechanism that is provided for forming an aperture in an endless inner tube, and the frame 18 carries the mechanism that applies a valve stem to the inner tube over the aperture formed therein. An unvulcanized inner tube to be apertured and to have a valve stem applied thereto is shown at 20; and during the successive operations of being apertured and receiving a valve stem said inner tube is supported upon a table 21, disposed beneath the aperturing and valve applying mechanisms. Said table requires to be movable in its own plane through an arc of limited extent so that a determinate region thereof may be positioned, in alternation, in alignment with the aperturing mechanism and with the valve applying mechanism, and to this end said table is mounted upon the free end of an arm 22 that rests upon the bed plate 10 beneath the plates 14, 15, the rear end of arm 22 being pivotally attached to the bed plate at 23, the forward end of said arm extending beyond the front margin of the bed plate. Mounted upon the free end of the arm 22, between the latter and the table 21, is a suction terminal block 24 that has an angular duct 25 therein extending from its top face to its rear face, there being a pipe 26 threaded into the opening of said duct on the rear face of the block, which pipe connects with a source of suction as subsequently will be explained. On the top face of the block 24 the duct 25 terminates in a counterbore, and seated in the latter is a perforated screen or disc 27 that is provided with an axial stem 28 that extends downwardly through the vertical portion of duct 25 and through a bore 29 of smaller size than said duct in vertical extension thereof. The lower end of the stem 29 extends into a slot 30 in the bottom face of the block, extending from front to rear thereof. The table 21 is formed with a countersunk aperture 31, that is in axial alignment with the vertical portion of duct 25 and is somewhat smaller than the counterbore at the top thereof. The thickness of the disc 27 is less than the depth of said counterbore so that it may have limited axial movement, upon occasion as desired. Angular movement of the arm 22 is limited by adjustable stop-members 32, 32 that are threaded through the respective spacer blocks 12 and extend into the arc of movement of said arm.

The arrangement is such that when the countersunk aperture 31 is overlaid by an inner tube 20 on table 21, suction applied through the pipe 26 and duct 25 will draw the adjacent wall of the tube 20 into the countersunk aperture, thus forming a recess or reentrant in the tube-wall, as is shown in Figure 5. The presence of the blister or air bubble in the tube above the aperture 31 effectually prevents the uppermost ply of the tube wall from being drawn into contact with the lower ply thereof. Slidably mounted in slot 30 of block 24 is an adjustment slide 33 that is so shaped as to lift the disc 27 from the position shown to engagement with the bottom face of table 21, thus reducing the depth of the recess into which the tube wall is drawn, and adapting the apparatus for operation upon inner tubes of different wall thickness.

The mechanism for aperturing the inner tube 20 is carried by the frame 17 and comprises a vertically disposed quill 34 that is slidingly mounted for axial movement in the forward overhanging portion of said frame. The outside surface of the quill is formed, on its rear side, with rack teeth 35, and meshed with the latter is an idler pinion 36, Figure 2, which in turn is meshed with an idler gear 37 of slightly larger size, said pinion and gear being journaled on suitable stub shafts carried by the frame 17. Meshed with gear 37 is a horizontally disposed rack 38 that is slidably carried by a bracket 39 secured to the side of frame 17, said rack being connected at its rear end to the piston rod of a fluid pressure operated cylinder 40 that is mounted upon a lateral surface of said frame. The cylinder 40 is of the double-acting type, the arrangement being such that the alternate charging of opposite ends thereof reciprocates the rack 38, with the result that the quill 34 is alternately raised and lowered.

At its lower end the quill has a portion 34a of somewhat larger diameter, and partly telescoped therewith is a tubular head or cup 42 that is secured thereto by set screws 43. At the upper end of the bore in head 42 is a bearing 44, and a similar bearing 45 is mounted within the upper end of quill 34, there being a vertically disposed punch spindle 46 carried by said bearings. The spindle 46 is of somewhat larger diameter below the bearing 44, and above said bearing the spindle carries a collar 47, the arrangement being such as to preclude axial movement of the spindle relatively of the quill. The lower end portion of the spindle 46 is still further enlarged in diameter, and is formed with an angular bore 48 therein that extends axially of the enlarged end of the spindle at its lower end and radially thereof at its upper end, the latter opening onto the outer face of the spindle above the lowermost enlarged portion thereof. On the bottom face of the spindle the bore 48 is counterbored to receive a tubular punch or cutter 49 that is retained therein by a set screw 50. As shown in Figures 4 and 5 the inside diameter of the cutter 49 is somewhat restricted at its upper end to prevent a slug or blank cut from the inner tube 20 from being drawn therethrough. Circumscribing the lower end portion of the spindle 46 is a stripper member 51 that is partly enclosed within the lower end portion of the head 42, a portion of the stripper projecting below the latter. Near its upper end the stripper 51 is formed exteriorly with a circumferential shoulder upon which is seated a compression spring 52, the upper end of said spring bearing against an internal shoulder formed in the bore of head 42, the arrangement being such as normally to urge the stripper downwardly, relatively of the spindle 46 and head 42. Secured to the bottom of the head 42 is a retainer ring 53 that underlies a shoulder of the medial portion of the stripper member and thereby retains the stripper 51 within the head 42. A set screw 54 is threaded through the stripper 51 within the head 42 and extends into an axially extending slot 55 in the perimeter of the stripper member to prevent rotary movement thereof. There is a slight clearance between the lowermost enlarged portion of the spindle 46 and the inner circumference of the stripper member 51, and a ring gasket 56 is so mounted between said members as to prevent the passage of air therebetween.

The lower end portion of the stripper 51 comprises a pair of downwardly extending arms 51a, 51a disposed at diametrically opposite points of the stripper, the lower ends of said arms being united to a flat stripper ring 58 that is disposed in a horizontal plane, concentric with the axis of the spindle 46 and cutter 49, the bottom face of said ring normally being disposed somewhat below the cutting end of the said cutter. The arrangement is such that when the quill 34 and spindle 46 are depressed toward an inner tube 20 on the table 21, the stripper ring 58 will engage the uppermost ply of the flattened inner tube, over the bubble or blister in the tube indicated by the numeral 59, Figures 3 and 4, and by pressing the two plies together under the ring, reduce the circumference of the blister and put that portion of the upper tube-wall ply within the ring under slight tension. As downward movement of the stripper ring ceases because of the resistance of the work therebeneath, continued downward movement of the head 42 and spindle 46, against the force of spring 52, moves the cutter 49 into engagement with the upper tube-wall ply, and through the latter, cutting a cylindrical blank or slug 60 therefrom, which slug is drawn upwardly into the cutter by suction, as presently will be explained. Because of the presence of the recess or reentrant in the bottom ply of the tube 20, caused by the suction applied thereto through duct 25, there is no possibility of the cutter 49 inflicting damage on the said bottom ply, and presence of the bubble or blister in the tube makes it unnecessary for the cutter to descend as far as otherwise would be necessary. The cutting of the slug is facilitated by the slight tension in that region of the tube from which the slug is cut.

During the cutting operation described, the cutter 49 is rapidly rotated upon its axis, and to this end the spindle 46 is provided at its upper end, above bearing 45, with a grooved pulley 62 about which is trained an endless transmission belt 63, the latter also being trained about a grooved driving pulley 64 mounted upon the shaft 65 of a motor 66. Said motor is mounted upon a suitable supporting bracket 67 that is carried by the frame 17, at the rear thereof.

As previously stated, the slug 60 is drawn into the rotating cutter 49 by suction, and subsequently it is ejected therefrom by super-atmospheric pressure. To this end the stripper member 51 is formed with a radial bore 69, and the head 42 is formed with a radial bore 70, the latter being threaded to receive a flexible pipe 71. Although the bores 69, 70 are disposed in the same vertical plane, they are not in axial alignment. The bore 69 functions chiefly as a means for applying suction to the work, through the cutter 49, during the cutting operation, as a means for drawing the slug 60 up into the cutter. During the cutting operation, as shown in Figure 5 the stripper member 51 is moved upwardly relatively of the spindle 46 and head 42 to such an extent as substantially to shut off the space between the head and the top of the stripper, but at such a time a portion at least of the bore 69 is above the shoulder on the spindle formed by the lowermost portion of greater diameter, with the result that said bore is accessible to air drawn through the bore 48 of the spindle. After a cutting operation, when the spindle and quill have been lifted to the position shown in Figure 4, the stripper 51 is in its lowered position under impetus of the spring 52 as shown, with the result that the stripper does not obstruct the bore 70 and air may flow readily between the pipe 71 and bore 48 of the spindle. Thus superatmospheric pressure discharged into the head 42 from pipe 71 is available for ejecting a slug 60 that previously has been drawn into the cutter 49.

The ejecting of the slug is effected automatically when the table 21 is swung angularly to its alternative position wherein the inner tube 20 is properly positioned beneath the valve-stem applying mechanism for the application of a valve stem thereto. The ejected slug is received in a suitable receptacle or box 75 that is mounted upon a bracket 76 that is secured to the table 21, at the rear thereof, the receptacle being so positioned upon the table as to be disposed directly beneath the cutter 49 when the table is swung to its alternative position beneath the valve-stem applying mechanism. The receptacle 75 is provided with a top closure in which is formed a countersunk aperture 77, Figure 2, through which the slug enters the receptacle. The receptacle is emptied from time to time as the slugs accumulate.

To facilitate the aperturing of the tube 20 by the cutter 49, a liquid lubricant is applied to the latter immediately before it enters the work. Such lubricant requires to be highly volatile since the presence of moisture on the tube where the valve stem is applied thereto will result in a blister in the finished tube. Alcohol has been found to be a satisfactory lubricant, although other highly volatile liquids may be found equally desirable. Alcohol is sprayed onto the rotating cutter 49 by means of a nozzle 79 that is so positioned as to direct the spray above the stripper ring 58 and between the two arms 51a that support the same. The nozzle constitutes a part of an atomizer 80 comprising a reservoir 81 for the liquid, the atomizer being operated by means of a blast of air supplied thereto by means of the pipe line 82. The latter extends to a source of super-atmospheric pressure (not shown), and includes therein a pressure regulator 83, pressure gauge 84, and a solenoid operated valve 85 that operates automatically when other elements of the apparatus are in determinate positions.

The mechanism for applying a valve stem to the inner tube 20, over the aperture cut therein by the cutter 49, is similar in some respects to the aperture forming mechanism. Thus it comprises a vertically disposed spindle 88 that is slidably mounted for axial movement in the overhanging portion of frame 18, parallel to the quill 34. The outer surface of the spindle is formed on its rear side, with rack teeth 89, and meshed with the latter is an idler pinion 90 which in turn is meshed with an idler gear 91 of slightly larger size, said pinion and gear being journaled on suitable stub shafts carried by the frame 18 and projecting laterally therefrom. Meshed with gear 91 is a horizontally disposed rack 92 that is slidably carried by a bracket 93 secured to the side of frame 18, said rack being connected at its rear end to the piston rod 94 of a double acting fluid pressure operated cylinder 95 that is mounted upon a lateral face of said frame by means of brackets 96, 96. The arrangement is such that the spindle 88 may be raised and lowered in the same manner as the quill 34 previously described, and such raising and lowering is effected automatically when other elements of the apparatus are in determinate positions. Secured to the lower end of spindle 88 is a tubular holder 97 for receiving a rubber valve stem, with the base flange of the latter disposed at the bottom thereof. Suitable leaf springs (not shown) are mounted in the holder 97 for lightly engaging the valve stem with sufficient pressure to retain it in the holder against the force of gravity, yet enabling the valve stem readily to be withdrawn from the holder after the valve stem base flange has been adhered to the inner tube 20, and the holder 97 is lifted therefrom. In Figure 3 a rubber valve stem 99, such as is applied to the tube 20, is shown below the holder 97 for purpose of illustration, it being understood that said valve stem will be mounted in the holder with only its base flange exposed at the bottom thereof at the beginning of a cycle of operation of the apparatus.

For greater assurance that alcohol lubricant, which may be on the tube 20 around the aperture therein, will be dried before the valve stem 99 is applied to the tube, an air blast is directed against the region of the tube that includes said aperture. To this end a pipe line 101 conducting air under super-atmospheric pressure has its delivery end provided with an arcuate nozzle 102 that is disposed adjacent the valve-stem applying mechanism, and so arranged as to direct a current of air onto the apertured region of the tube 20 on table 21, when the latter has been swung angularly to bring the aperture in the tube into axial alignment with the spindle 88. For releasing air from the pipe line 101, the latter is provided with a valve 103 having an operating plunger that projects into the arc of movement of the arm 22, and is depressed by the latter when swung to position beneath the valve stem applying mechanism to release the air to the nozzle 102.

As previously stated, some of the mechanisms of the apparatus operate automatically when other mechanisms are determinately positioned. This is effected by means of certain electrical switches, valves that are solenoid operated for determinate time intervals and otherwise, and piping connections. Since said mechanisms do not constitute a part of the invention, most of them are omitted from the drawings and description to conserve time. However, a brief outline of their arrangement is given in order that the operation of the apparatus may be understood.

As shown in Figure 1, there is provided a 3-way reverse acting diaphragm valve 104 to which extends the flexible pipe 71 that alternately applies suction to the head 42 and discharges air under super-atmospheric pressure thereinto. Extending from the valve 104 to a suitable source of suction (not shown) is a pipe 105, and connected to the latter is a flexible hose 106 that connects with the hose 26 that extends to table 21 for applying suction through the aperture 31 in the top of the latter. Also connecting with the valve 104 is a pipe 107 that extends therefrom to a suitable source of air under pressure (not shown). The valve 104 operates to apply suction through the pipe 106 and 71, or to apply air under pressure through the latter pipe, according to the presence or absence of pressure in a pipe 108 that connects with the top of the valve. The pipe 108 also is connected to a pipe (not shown) that supplies air under pressure to the rear end of cylinder 95 for charging the latter to project rack 92 and thereby to lower spindle 88, and thereby to apply a valve stem 99 to inner tube 20. Both the cylinder 95 and the cylinder 40 are operated by suitable valves (not shown) which valves are solenoid operated, and include timing mechanism for controlling the length of time that the pistons thereof remain in outermost or projected positions. Operation of said solenoids, and the solenoid valve 85, is controlled by means of two, normally open electrical switches 110 and 111, which switches are mounted below the frames 17, 18 so as alternately to be engaged by the arm 22 and closed, as said arm is swung from one of its angular positions to the other. A manually operated electrical switch 112, in series with the aforesaid switches, is provided for effecting operation of the aperturing mechanism and the valve stem applying mechanism.

In the operation of the apparatus, the operator after stroking the endless tube structure 20 to form a blister 59 therein, cleans the top surface of the blister with a volatile liquid, and then mounts the tube on the table 21, as shown in Figure 3, with the cleaned surface uppermost and with the blister over the aperture 31 of the table. Suction through aperture 31 in said table draws a local region of the underlying tube wall downwardly thereinto and forms a recess or depression therein as shown in Figure 5. Suction also is applied to the head 42 through pipe 71. Previously a valve stem 99 has been mounted in the holder 97, and the motor 66 is constantly driven to rotate the cutter 49. The operator then swings the table 21 to the left to align it properly with the aperturing mechanism, which movement of the arm 22 also closes the control switch 110, after which the operator presses the manually operated switch 112. As soon as the latter switch is closed the solenoid operated valve 85 is operated to admit air to the pipe 82 and thereby to cause a spray of alcohol to be discharged from the nozzle 79 onto the cutter 49.

Closing of the last mentioned switch also effects operation of the solenoid-operated valve that controls fluid pressure cylinder 40, the rear end of the latter thereby being charged as its front end is discharged, with the result that its piston is moved outwardly and the quill 34 moved downwardly. At the limit of the downward movement of the quill, stripper ring 58 presses blister 59 of the work and puts a portion of the blister wall under tension, and said tensioned portion then is apertured by the rotating cutter 49. The slug 60 cut out by the cutter is drawn up into the latter by the suction within the head 42. As soon as the quill 34 reaches its lowermost position the time operated solenoid valve controlling cylinder 40 reverses its position to effect the lifting of the quill, at which time the stripper ring 58 operates to strip the tube wall from the cutter 49.

The operator then swings the table 21 to the right to bring the apertured tube thereon beneath the valve stem applying mechanism, and to position the receptacle 75 carried thereby beneath the aperturing mechanism with its aperture 77 directly below the cutter 49. As table 21 is swung to its alternative position, its supporting arm 22 engages the operating plunger of valve 103 to open the latter and admit air under pressure to the nozzle 102, the latter directing the air onto the aperture previously formed in the inner tube and drying any lubricant remaining thereon. Swinging of arm 22 also opens the switch 110 it previously had closed, and closes switch 111 in the circuit of the other solenoid operated valve. The operator then again operates the manually operated switch, thus starting a cycle of operation of said solenoid operated valve, which first effects the charging of the rear end of cylinder 95 to lower the spindle 88. Charging of said cylinder 95 also admits air through pipe 108 to valve 104, the latter then functioning to shut off suction to the head 42 and to admit air under pressure thereto, with the result that the slug 60 is ejected from the cutter 49 and projected into the receptacle 75. As the spindle 88 reaches its lowermost position it presses the base flange of the valve stem 99 upon the inner tube 20, over the aperture therein, so that said flange adheres to the tube. The control valve of cylinder 95 automatically reverses itself to retract the piston of said cylinder and thereby to lift spindle 88, the valve stem 99 being thereby pulled from the holder 97 on the end of the spindle. Reversing of cylinder 95 releases the pressure in pipe 108 and thereby restores valve 104 to original position, with the result that air pressure to head 42 is shut off and suction substituted therefor. The inner tube 20 with valve stem applied thereto is then removed from table 21 and dropped onto conveyor 11, which removes it from the apparatus to a point removed therefrom where other operations may be performed upon it. This completes a cycle of operation, which may be repeated as often as desired.

The invention is simple and efficient, and assures that the aperturing of the tube wall will not result in damage to the opposite wall of the tube.

Modification may be resorted to without departing from the spirit of the invention, or the scope thereof as defined by the appended claims.

What is claimed is:

1. In apparatus for making inner tubes, the combination of a tube aperturing mechanism and a valve-stem applying mechanism spaced therefrom, a support for the work alternatively positionable below the aperturing mechanism and the valve stem applying mechanism, means for applying suction to the aperturing mechanism when the work support is beneath the same, and means for applying superatmospheric pressure to the aperturing mechanism when the work support it beneath the valve stem applying mechanism.

2. A combination as defined in claim 1 including a receptacle carried by the work support and so arranged thereon as to be positioned beneath the aperturing mechanism when the work support is beneath the valve stem applying mechanism, said receptacle receiving a slug ejected from the aperturing mechanism when superatmospheric pressure is applied thereto.

3. In apparatus for making inner tubes, the combination of a vertically reciprocable head, a rotatable spindle disposed within the same coaxially thereof, a circular cutter at the lower end of said spindle, stripper mechanism carried by said head and movable axially relatively of the head and said cutter, said stripper mechanism comprising a flat ring disposed concentrically of the cutter, means for applying superatmospheric pressure around the upper end of the stripper structure to the interior of the cutter in one of the positions of the stripper, and means for applying suction through the upper portion of the stripper structure to the interior of the cutter in the alternative position of the stripper.

4. In apparatus for making inner tubes, the combination of a tubular rotary cutter, a work-supporting table selectively positionable in either of two alternative positions, in one of which positions it is directly beneath said cutter, means for reciprocating the cutter toward and from an inner tube on said table, means for applying suction or super-atmospheric pressure alternatively to the cutter, respective means controlling the application of suction and super-atmospheric pressure to said cutter, and means for operating said last mentioned means automatically according to the position of the table.

5. In apparatus for making inner tubes, the combination of a tubular rotary cutter, a work-supporting table selectively positionable in either of two alternative positions, in one of which positions it is directly beneath said cutter, a swingable arm supporting said table, means for reciprocating said cutter toward and from an inner tube on said table, means for applying suction or super-atmospheric pressure alternatively to the cutter, and respective means controlling the application of suction and super-atmospheric pressure to said cutter, said means positioned in the path of the swingable arm so as to be operated by the swinging thereof.

HORACE D. STEVENS.